United States Patent
Lee

(10) Patent No.: US 10,596,458 B2
(45) Date of Patent: Mar. 24, 2020

(54) INTELLIGENT SERVICE SYSTEM, APPARATUS, AND METHOD FOR SIMULATORS

(71) Applicant: MOTION DEVICE INC., Anyang-si, Gyeonggi-do (KR)

(72) Inventor: Jong Chan Lee, Anyang-si (KR)

(73) Assignee: MOTION DEVICE INC., Anyang-si (KR)

( * ) Notice: Subject to any disclaimer, the term of this patent is extended or adjusted under 35 U.S.C. 154(b) by 45 days.

(21) Appl. No.: 15/886,377

(22) Filed: Feb. 1, 2018

(65) Prior Publication Data
US 2018/0229115 A1   Aug. 16, 2018

(30) Foreign Application Priority Data

| Feb. 10, 2017 | (KR) | ......................... 10-2017-0018487 |
| Feb. 10, 2017 | (KR) | ......................... 10-2017-0018495 |
| Dec. 7, 2017  | (KR) | ......................... 10-2017-0167529 |

(51) Int. Cl.
| G09B 9/00   | (2006.01) |
| A63F 13/25  | (2014.01) |
| G06T 19/00  | (2011.01) |
| G06Q 10/10  | (2012.01) |
| A63F 13/27  | (2014.01) |
| G02B 27/01  | (2006.01) |
| G09B 5/06   | (2006.01) |

(52) U.S. Cl.
CPC .............. *A63F 13/25* (2014.09); *A63F 13/27* (2014.09); *G06Q 10/10* (2013.01); *G06T 19/006* (2013.01); *G09B 9/00* (2013.01); *G02B 27/017* (2013.01); *G09B 5/06* (2013.01)

(58) Field of Classification Search
None
See application file for complete search history.

(56) References Cited

U.S. PATENT DOCUMENTS 8,396,727 B2 *  3/2013  Waytena ................ G06Q 10/02
                                                            705/5

FOREIGN PATENT DOCUMENTS

KR       20-0435980 Y1    3/2007

* cited by examiner

*Primary Examiner* — James S. McClellan
*Assistant Examiner* — Peter J Iannuzzi
(74) *Attorney, Agent, or Firm* — Stein IP, LLC

(57) ABSTRACT

Provided are an intelligent service system, apparatus, and method for simulators which provide a high quality announcement service compared to that of by humans. The intelligent service system for simulators includes an information collection section configured to collect information on a simulation participant or onlookers from an information collector, and an announcement generator configured to generate an announcement to be provided to the simulation participant or onlookers based on the information collected by the information collection section.

12 Claims, 2 Drawing Sheets

INTELLIGENT SERVICE SYSTEM, APPARATUS, AND METHOD FOR SIMULATORS

CROSS-REFERENCE TO RELATED APPLICATION

This application claims priority to and the benefit of Korean Patent Application No. 10-2017-0018487, filed Feb. 10, 2017, Korean Patent Application No. 10-2017-0018495, filed Feb. 10, 2017, and Korean Patent Application No. 10-2017-0167529, filed Dec. 7, 2017, the disclosures of which are incorporated herein by reference in its entirety.

BACKGROUND

1. Field of the Invention

The present invention relates to an intelligent service system, apparatus, and method for simulators which are capable of providing various announcements to a simulation participant and onlookers.

2. Discussion of Related Art

A simulator, particularly a motion simulator, is an apparatus that enables a participant to feel movement in virtual reality (VR) as felt in the real world by making dynamic changes according to a virtual environment controlled by a computer. The simulator may include a simulation screen, a control lever, and a seat that moves in two or three dimensions while a participant is sitting on the seat. Also, the simulator includes components for rotary motion and linear motion thereof. The simulator may move according to a combination of linear motions from front-back (a Z axis), left-right (an X axis), and up-down (a Y axis), and rotary motions including rolling motion around the Z axis, pitching motion around the X axis, and yawing motion around the Y axis. Accordingly, when the participant manipulates the control lever, the simulator may operate according to manipulation of the participant such that the participant in a simulation performed by the simulator may be immersed in the simulation.

Due to this characteristic, simulators are applied to flight simulations, driving simulations, and the like, and recently, game simulators, theater simulators, and the like are widely being used to provide three dimensional (3D) experiences.

Although the initial market of VR theme parks using simulators, which are such VR experience equipment, is being formed, VR theme parks result in low profit due to a high ratio of operational cost to investment.

The high operational cost results from high personnel expenses for the service.

Also, manpower for helping a user board on a simulator is required for a user to experience the simulator, and sales greatly depend on service onboard (the service of recognizing a user's emotions and providing appropriate guidance to the user by communicating with the user as necessary). In other words, the manpower for helping users board onto a simulator attracts onlookers' attention and provides various announcements to establish a pleasant atmosphere. However, the cost of assistant manpower is high in comparison to sales, and it is difficult for short-term part-time manpower to fully attract onlookers' attention and continuously provide a high-quality onboard service.

Further, it is necessary to provide simulation game participants with an announcement service appropriate for various situations that may occur in the game. For example, it is necessary to provide a participant in a racing game with information required for the game, such as wheel operability, current location and speed of a vehicle, and the like.

When a person makes such an announcement, it is not possible to simultaneously make the announcement to a plurality of game participants. Nonetheless, it is not possible to simultaneously make different announcements to a plurality of participants in a simulation game.

The core technology for providing various high quality announcements, which will play a crucial role in VR theme parks, is artificial intelligent (AI) technology. Therefore, it is necessary to develop an intelligent service system for providing such an announcement service.

Such an intelligent service robot for simulators is required to provide an intelligent service and appropriate guide service when working with a simulator and simulation participants.

Related art of such an intelligent guide robot system is disclosed in Korean Utility Model No. 20-0435980.

SUMMARY OF THE INVENTION

The present invention is directed to providing an intelligent service system, apparatus, and method for simulators which provide a high quality announcement service compared to that of by humans.

The present invention is also directed to providing an intelligent service system, apparatus, and method for simulators which are capable of simultaneously providing different announcements to a plurality of simulation participants or onlookers.

The present invention is also directed to providing an intelligent service system, apparatus, and method for simulators which are capable of providing an appropriate guide service to a simulation participant or an onlooker.

According to an aspect of the present invention, there is provided an intelligent service system for simulators, the system including: an information collection section configured to collect information on a simulation participant or onlooker from an information collector; and an announcement generator configured to generate an announcement to be provided to the simulation participant or onlooker based on the information collected by the information collection section.

The information may be from at least one of image information, voice information, and brainwave information received from the information collector.

The information collector may be installed in at least one of a ceiling, the simulator, and a robot travelling along a fence surrounding a simulator, and the information collection section may collect information for generating the announcement from the information collector.

The intelligent service system may further include an identification section configured to determine whether the participant or onlookers are members based on the information collected by the information collection section, and the announcement generator may generate the announcement by using a determination result of the identification section.

When there are a plurality of participants, the announcement generator may generate different announcements to be provided to the plurality of participants, to both the participants and the onlookers, or an announcement about a situation of an ongoing simulation to be provided to the onlooker.

The intelligent service system may further include a data manager configured to store information on a plurality of members, and the announcement generator may generate an announcement to be provided to the participant based on the member information stored in the data manager.

In this case, when there are a plurality of participants and the announcement generator receives member information of the plurality of participants from the data manager and determines that there is a social relationship between the plurality of participants, the announcement generator may generate an announcement corresponding to the social relationship.

The intelligent service system may further include a data manager configured to manage data for generating the announcement, and when the participant is not a member stored in the data manager, the announcement generator may generate an announcement to be provided to the participant based on data previously stored in the data manager.

According to an aspect of the present invention, there is provided an intelligent service apparatus for simulators including the information collection section and the announcement generator.

According to an aspect of the present invention, there is provided an intelligent service method for simulators including: a) collecting information on a simulation participant or onlookers from an information collector; b) generating an announcement to be provided to the simulation participant or onlookers based on the collected information; and c) providing the generated announcement to the participant or onlookers.

The information collected in a) may include information collected from the information collector installed in at least one of a ceiling, a simulator, and a robot moving around the simulator.

When there are a plurality of participants and it is determined based on member information of the plurality of participants that there is a social relationship among the plurality of participants, an announcement corresponding to the social relationship may be generated and simultaneously provided to the plurality of participants.

When there are a plurality of participants, different announcements may be generated for the plurality of participants and separately provided to the participants during a simulation, or different announcements may be simultaneously provided to the plurality of participants.

Different announcements may be generated for and separately provided to the participant and the onlookers.

The intelligent service method may further include notifying the simulation participant of a boarding process by generating an announcement to notify the simulation participant to board on a simulator.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, an intelligent service system for simulators according to an exemplary embodiment of the present invention will be described in detail.

Figure 1:
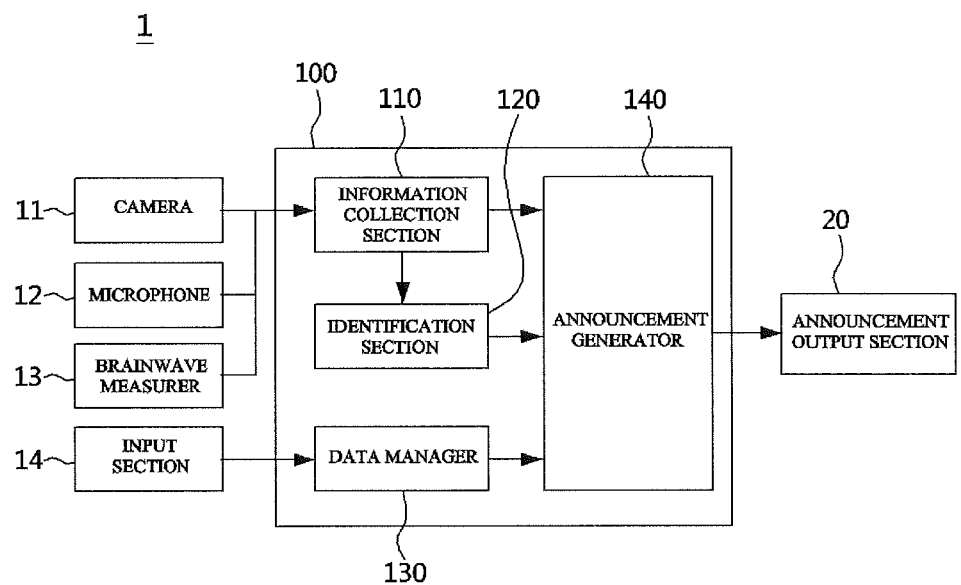
FIG. 1 is a block diagram of a schematic configuration of an intelligent service system for simulators according to an exemplary embodiment of the present invention.

Referring to FIG. 1, an intelligent service system 1 for simulators according to an exemplary embodiment of the present invention includes an information collection section 110 that collects information on a simulation participant or onlookers from an information collector, and an announcement generator 140 that generates an announcement to be provided to the simulation participant or onlookers based on the information collected by the information collection section 110.

A simulator for running a simulation according to an exemplary embodiment of the present invention may be configured to move according to a combination of linear motions from front-back (Z axis), left-right (X axis), and up-down (Y axis), and rotary motions including rolling motion around the Z axis, pitching motion around the X axis, and yawing motion around the Y axis.

The information collected by the information collection section 110 may be at least one from image information, voice information, brainwave information, emotional information, and five senses information.

The information collector may be at least one of a camera 11, a microphone 12, and a brainwave measurer 13.

The information collection section 110 functions to collect information from at least one of the camera 11, the microphone 12, and the brainwave measurer 13, which are the information collectors. Specifically, the information collection section 110 functions to collect information on a plurality of images (e.g., photographs or a video) captured by the camera 11, voice information received through the microphone 12, and brainwave information measured by the brainwave measurer 13.

Also, the information collector may be a moisture sensor for sensing sweat on a hand of the participant grabbing a control stick of the simulator to conduct the simulation, or a pressure sensor for sensing pressure of the hand of the participant grabbing the control stick. In other words, it is possible to determine whether the participant is tense by sensing sweat on his or her hand, and whether the participant is tense or immersed by a change in pressure of the participant's hand grabbing the control stick. A value sensed by the sensor may be collected as current information on the participant's feeling or five senses by the information collection section 110. As means for measuring information on the participant's emotions or five senses, a moisture sensor and a pressure sensor have been described above. However, means for measuring information on the participant's emotions or five senses are not limited thereto, and various sensors may be used to determine the participant's emotions or five senses.

There may be a plurality of cameras 11. For example, at least one of the cameras 11 may be installed in the simulator toward the boarding participant to capture images of the participant, and other cameras 11 may be disposed around the simulator and the like to capture images of onlookers. Needless to say, a camera 11 may be installed at a position such as a ceiling to capture images of the simulator and the surroundings thereof so that onlookers who are gathering may be sensed.

Figure 2:
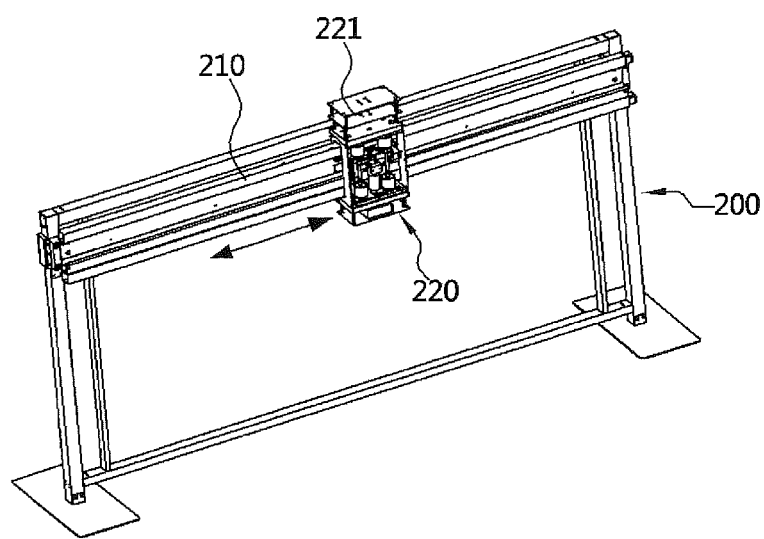
FIG. 2 is a perspective view of a robot that travels along a fence in an intelligent service system for simulators according to an exemplary embodiment of the present invention.

As shown in FIG. 2, the camera 11 may be installed in a robot 220 that travels along a rail 210 on the upper end of a fence 200 surrounding the simulator, and the camera 11 installed in the robot 220 may capture images of the participant or onlookers while the robot 220 travels along the rail 210.

It is possible to read facial expressions of the participant or onlookers through the camera 11, and to receive voices of the participant or onlookers through the microphone 12. Another sensor for receiving the voices of the participant or onlookers may be additionally included. When a plurality of participants are participating in the simulation game, the camera 11 may be installed in each of the simulators on which the plurality of participants are boarding.

The brainwave measurer 13 may be provided to measure the participant's brainwaves when the simulation participant boards on the simulator.

Information collected in the above-described way may be acquired through wired or wireless communication by the information collection section 110. In the above description, the term "camera" includes all types of equipment that capture an image of a target. In other words, a camera may include not only a general camera, a depth camera, a wide-angle camera (e.g., a camera including a wide-angle lens or a fisheye lens), but also a sensor-type camera. Further, it should be noted that a camera includes the concept of an image sensor for processing a captured image together with the concept of a camera.

The announcement generator 140 generates an announcement to be provided to the participant or onlookers based on at least one from the image information, voice information, brainwave information, emotional information, and five senses information collected by the information collection section 110.

The announcement generator 140 may generate the announcement by using an artificial intelligence (AI) learning algorithm.

As the learning algorithm, a decision tree that is an analysis method of performing classification and making a prediction by schematizing decision rules into a tree structure, a Bayesian network that is a model for expressing probabilistic relationships (conditional independence) between many variables in the form of a graph, a support vector machine (SVM) that is a supervised learning model for pattern recognition and data analysis, an artificial neural network that is an information processing system, in which many neurons referred to as nodes or processing elements are connected in a layer structure, modeled from operating principles of biological neurons and connection relationships between neurons, and the like are known.

Also, deep learning, which is a technology used to cluster or classify data by using an artificial neural network, is noted. An artificial neural network in machine learning and cognitive science is a statistical learning algorithm inspired by biological neural networks, such as the central nervous system, particularly in brains of animals. An artificial neural network indicates all models in which artificial neurons (nodes) forming a network through synaptic coupling have problem-solving capabilities by changing synaptic coupling strength. The core of deep learning using an artificial neural network is prediction through classification. A computer classifies data, as a human distinguishes an object, by finding patterns in numerous pieces of data.

The announcement generator 140 may generate an announcement suitable for the participant or onlookers by using the collected information according to the AI learning algorithm. Also, the more learning data of the AI is accumulated, the more appropriate announcements may be generated.

The announcement generator 140 may provide a guide function in a process in which the participant boards on the simulator. Such a guide function may provide the participant with a voice service appropriate for the facial expressions and voices of participants.

Also, the announcement generator 140 may receive information identified by an identification section 120 and a data manager 130.

The identification section 120 functions to identify the participant or onlookers by analyzing a plurality of pieces of image information and voice information. For example, the identification section 120 may classify image information captured by a camera disposed inside the simulator as the participant's, and image information captured outside the simulator as the onlookers'. The identification section 120 may further perform a process of determining whether the participant or onlookers identified by the identification section 120 are registered members by analyzing image information. For example, the identification section 120 may identify the face of the participant or onlookers from the plurality of pieces of image information, compare the identified face with face information of members stored in a storage (not shown), and thereby determine whether the participant or onlookers are members.

When the participant is identified as a member, it is possible to generate an announcement appropriate for the participant by combining at least one of member information stored in the data manager 130 with the image information, voice information, and brainwave information collected from the information collection section 110.

It may be determined whether the participant is a member not by the identification section 120 but by the using of information input through an input section 14 during a process of the participant boarding on the simulator.

The data manager 130 functions to store information on a plurality of members in the storage (not shown) and provides the member information to the announcement generator 140 so that an announcement related to the member information may be generated. Also, the data manager 130 may store information input through the input section 14 when the participant boards on the simulator. The input section 14 may be configured so that any one of a cellular phone number, a name, and an identification (ID) of the participant is input. Also, the input section 14 may be configured so that any one of a photograph, an email address, an image of an iris, and a fingerprint is input. Information input through the input section 14 and the member information stored in the data manager 130 may be compared to determine whether the participant is a member when the participant boards on the simulator.

The data manager 130 may store boarding records of members and provide related information to the announcement generator 140 so that the announcement generator 140 may generate an announcement suitable for the participant based on the boarding records.

When there are a plurality of participants, the data manager 130 may determine social relationships between the participants and provide related information to the announcement generator 140 so that the announcement generator 140 may generate an announcement related to the relationships between the plurality of participants. Here, the social relationships between participants may include relationships between friends, lovers, family members, and the like.

The data manager 130 stores various types of information for generating announcements in addition to the aforementioned information, and provides the stored information to the announcement generator 140 so that various announcements may be generated. For example, when the participant is not a member, the data manager 130 may provide related data to the announcement generator 140 so that the announcement generator 140 may generate an announcement suitable for the participant who is not a member based on data previously stored in the data manager 130. Also, the data previously stored in the data manager 130 may be data that is generated according to the AI learning algorithm to provide announcements.

An announcement output section 20 may be a speaker for providing an announcement to the participant by voice, a head mounted display (HMD) worn by the participant, or other image display devices. The announcement output section 20 may further include a speaker or an image display device for providing an announcement to onlookers by image or voice.

A robot that travels along a fence in an intelligent service system for simulators according to an exemplary embodiment of the present invention will be described with reference to FIG. 2.

The fence 200 surrounding the simulator is installed. The simulator is installed inside the fence 200, and onlookers may view the simulation by standing outside the fence 200. FIG. 2 shows only one side of the rectangular fence 200 that surrounds the simulator. The fence 200 may have various shapes such as a polygon including a rectangle, a circle, and the like.

The rail 210 is combined with an upper portion of the fence 200, and the robot 220 may travel along the rail 210.

A power supply for supplying power is connected to the robot 220. Also, the robot 220 has a driving section to travel along the rail 210.

The camera 11 or the microphone 12 may be integrally formed with a holder 221 of the robot 220. The camera 11 takes images inside or outside of the fence 200. Here, the camera 11 detects the position of the participant or an onlooker and receives the facial expressions of the participant or onlooker as image information. Also, the microphone 12 detects the voice of the participant or onlookers as voice information. In this case, two cameras 11 may be provided to separately take images inside or outside of the fence 200, and two microphones 12 may be provided to separately detect inside and outside voices.

Due to such a structure, the robot 220 may detect the facial expressions or voices of the participant and onlookers inside and outside the fence 200 by travelling on the fence 200 along the rail 210.

At least one type of information from images and voices detected by the camera 11 and the microphone 12 is received by the announcement generator 140, and the announcement generator 140 determines what kind of voice or text message will be sent to the participant or onlookers based on the received information.

A speaker or display which is the announcement output section 20 may be provided inside or outside of the fence 200. The announcement generator 140 generates an announcement to onlookers provided by voice through the speaker and by text through the display, as a guide service.

Although a case in which the robot 220 travels on the fence 200 along the rail 210 has been described as the exemplary embodiment of FIG. 2, the robot 220 may also be fixed at the fence 220, and the camera 11 or the microphone 12 may be installed inside the robot 220.

An intelligent service apparatus 100 including the information collection section 110, the identification section 120, the data manager 130, and the announcement generator 140 may be provided. The intelligent service apparatus 100 may be a server provided in a place in which the simulator is installed. Also, the intelligent service apparatus 100 may be a cloud server connected to the Internet. A computer program for providing a participant or onlookers with an announcement generated by using the information collection section 110, the identification section 120, the data manager 130, and the announcement generator 140 may be stored in the intelligent service apparatus 100.

According to the intelligent service system 1 configured as described above, it is possible to provide an appropriate voice or text service corresponding to at least one of facial expressions, voices, brainwaves, emotions, and the five senses of a simulation participant or onlookers, in response to at least one of image information, voice information, brainwave information, emotional information, and five senses information of the participant or onlookers.

The announcement may be provided not only when there are a plurality of simulation participants, but also when there is one simulation participant.

Figure 3:
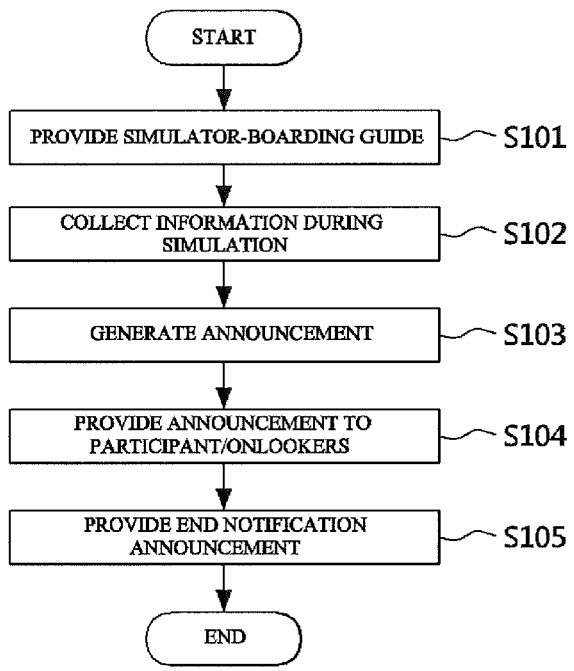
FIG. 3 is a flowchart of an intelligent service method for simulators according to an exemplary embodiment of the present invention.

An intelligent service method for simulators according to an exemplary embodiment of the present invention will be described with reference to FIG. 3.

In operation S101, a boarding guide is provided during a process of a participant boarding on a simulator.

The boarding guide may include a function for inputting member information, for inducing boarding, for recognizing a customer, for guiding, and the like.

First, member information of a participant who wants to participate in a simulation is input to the input section 14. When the participant is not a member of a simulation service, a process of inducing the participant to subscribe to the simulation service may be performed. At least one of a cellular phone number, a name, an ID, a photograph, an email address, an image of an iris, and a fingerprint of the participant may be input to the input section 14. It is possible to determine whether the participant is a member by comparing the information input through the input section 14 and member information stored in the data manager 130. Also, the member information may further include personal data such as the participant's sex, age, etc.

In this case, when there are a plurality of simulation participants, member information of the plurality of participants may be input, and the plurality of participants may be induced to input information on social relationships therebetween. Also, information on the social relationships between the participants may be generated according to the input information.

For example, when a plurality of persons, in a social relationship between lovers or friends, participate in the simulation, the data manager 130 may generate and provide information on the social relationship to the announcement generator 140 so that an announcement related to the specific social relationship is generated.

A guide function including such a function of inputting member information may be provided to the announcement generator 140 based on the information received from the data manager 130, and due to the guide function, it is possible to provide a simulation participant with necessary information and an announcement service to which the participant may respond.

The function of inducing boarding is a service for recognizing emotions of onlookers around the simulator based on image or sound information collected through the information collection section 110, generating an announcement through the announcement generator 140 by voice or text to induce boarding, and provide the generated announcement through the announcement output section 20.

The customer recognition function involves the announcement generator 140 recognizing an ID of a member and calling his or her name based on information of the data manager 130 and providing an announcement based on his or her previous record(s) of boarding.

The guide function involves inducing a participant to enter and board on the simulator, notifying the participant of a method of fastening a safety belt, and of instructions to play game content by using a simulator manipulation method and the like.

When participants board on the simulator through the boarding guide described above, the simulation game proceeds.

In operation S102, the participants participate in the simulation and play the game, and the information collection section 110 collects information from at least one of image information, voice information, brainwave information, emotional information, and five senses information.

When the participants separately board on a plurality of simulators and the simulation game proceeds, the participants play a simulation game together, such as a racing game, by manipulating the simulators.

In this case, the information collection section 110 including at least one of the camera 11, the microphone 12, and the brainwave measurer 13 installed in each simulator collects information from at least one of image information, voice information, brainwave information, emotional information, and five senses information of each simulation participant and transmits the collected information to the announcement generator 140.

The data manager 130 may provide the participant's previous record(s) of boarding, information on social relationships, and the like, to the announcement generator 140.

While the robot 220 installed on the fence 200 travels along the rail 210, image or voice information of onlookers may be collected by the camera 11 or the microphone 12 installed in the robot 220 and may be provided to the announcement generator 140.

In operation S103, the announcement generator 140 generates an announcement to be provided to the participant or onlookers based on the information collected by the information collection section 110.

The announcement provided to the participant or onlookers may provide praise, consolation, or information. When the participant obtains an excellent performance result, an announcement of praise may be generated. When the participant obtains a poor experiential result, an announcement of consolation may be generated. An announcement for transferring information such as a score, an event, new content, etc. of the simulation game may be generated to provide the information. Also, the announcement may include methods of handling various situations (changing or handling speed in a specific section, and the like) occurring in a simulation game, such as a racing game (a method of changing or handling speed in a specific section, and the like).

The announcement generator 140 generates an announcement corresponding to the collected at least one of image information, voice information, brainwave information, emotional information, and five senses information of the participant in response to the collected at least one of image information, voice information, brainwave information, emotional information, and five senses information. In this case, an AI learning algorithm may be used to generate the announcement.

The AI learning algorithm may receive the participant's previous records of boarding and social relationship information from the data manager 130, information from at least one of image information, voice information, brainwave information, emotional information, and five senses information of the participant from at least one of the camera 11, the microphone 12, and the brainwave measurer 13, and situational information of the simulation game currently played by the participant, to comprehensively analyze these pieces of information, learn previous data, and generate an announcement suitable for each of the plurality of participants and among the particular plurality, an announcement suitable for participants in social relationships.

Also, the AI learning algorithm may analyze image or voice information of onlookers detected by the camera 11 or the microphone 12 installed in the robot 220, rouses onlookers' interests by associating the analyzed image or voice information with the current situation of the ongoing simulation game, and generate an announcement for increasing immersion in the simulation game.

In this case, a commentary on the current situation of the simulation participant, the simulation game, and the like may be provided to onlookers through announcements. Such announcements may be used for the announcement generator 140 to relay the simulation game to onlookers.

Since a simulator in which a simulation of the present invention is performed moves according to a combination of linear motions in three axial directions and rotary motions including rolling, pitching, and yawing motions, movement of the simulator is big and dynamic. Therefore, a participant experiences various emotions as a result of speed, thrill, etc., when conducting a dynamic simulation with big movement rather than a simulation game with small or no movement. The various emotions of a participant who is conducting a simulation may be determined based on information such as the participant's facial expression and voice, sweat sensed from the participant's hand, pressure applied to a control stick, and the like, and it is possible to increase immersion and satisfaction of the participant to the simulation by providing a suitable announcement.

In operation S104, the announcement generated by the announcement generator 140 is provided to the participant or onlookers through the announcement output section 20.

Different announcements generated by the announcement generator 140 may be provided to participants through the announcement output section 20. Alternatively, the same announcement may be simultaneously provided to all participants, to specific participants, or to particular participants having social relationships among all participants, while another announcement may be provided to other participants. In addition, an announcement with different content may be provided to onlookers than an announcement to participants.

In operation S105, the simulation game ends, and an announcement notifying the participant of the end is provided. Since the end notification announcement is a farewell, "see you later" and the like may be provided.

It is possible to increase the pleasure of a simulation participant by providing the aforementioned announcement service. Reactions of participants and onlookers to variations in announcements (sex of voice, way of speaking, intonation, content, etc.) provided by an AI service are acquired as big data, and the service is provided according to general preference and individual preference, such that an intelligent database system for increasing customers' satisfaction may be constructed.

When a person makes such an announcement, it is not possible to provide individual announcements to a plurality of participants. When the above-described intelligent service system for simulators is used, it is possible to provide appropriate announcements to individual participants and to provide announcements appropriate for situations of a plurality of participants or onlookers.

A computer-readable recording medium for storing a program for executing the intelligent service method for simulators according to an exemplary embodiment of the present invention is, for example, a read-only memory (ROM), a random access memory (RAM), a compact disc read-only memory (CD-ROM), a magnetic tape, a floppy disk, an optical media storage device, and the like. Also, the computer-readable recording medium for storing an application, which is a program for executing the intelligent service method for simulators according to an exemplary embodiment of the present invention may be a storage medium (e.g., a hard disk) included in an application store server or an application provider server including a web server and the like related to the application or the corresponding service, or may be the application provider server itself.

An intelligent service apparatus for simulators capable of reading a recording medium for storing an application, which is a program for executing the intelligent service method for simulators according to an exemplary embodiment of the present invention may include mobile terminals, such as a smart phone, a tablet personal computer (PC), a mobile communication terminal, etc., as well as general PCs, such as a general desktop computer, a laptop computer, etc.

As described above, according to exemplary embodiments of the present invention, a high quality onboard service can be continuously provided to a customer at low maintenance costs such that customer satisfaction can be improved.

Also, different announcements can be simultaneously made to a plurality of game participants, and an announcement appropriate for a game situation can be made, such that the game participants can be further interested and immersed in the game.

Further, it is possible to provide an appropriate announcement service to onlookers outside a fence as well as to a simulation participant.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An intelligent service system for a simulators, the system comprising:
   an information collection section configured to collect information on a simulation participant or onlookers from an information collector; and
   an announcement generator configured to generate an announcement to be provided to the simulation participant or onlookers based on the information collected by the information collection section,
   wherein the simulator is surrounded by a fence on which a rail is provided,
   wherein the information collector includes at least one of a camera for obtaining image information on the participant or onlookers, a microphone for obtaining voice information on the participant or onlookers and a brainwave measurer for obtaining information on brainwaves of the participant or onlookers, the information collector being included in a robot travelling along the rail of the fence surrounding the simulator.

2. The intelligent service system of claim 1, wherein the information collection section collects information for generating the announcement from the information collector.

3. The intelligent service system of claim 1, further comprising an identification section configured to determine whether the participant or onlookers are members based on the information collected by the information collection section,
   wherein the announcement generator generates the announcement by using a determination result of the identification section.

4. The intelligent service system of claim 1, wherein when there are a plurality of participants, the announcement generator generates different announcements to be provided to the participants, to both the participants and the onlookers, or an announcement about a situation of an ongoing simulation to be provided to the onlooker.

5. The intelligent service system of claim 1, further comprising a data manager configured to store information on a plurality of members,
   wherein the announcement generator generates an announcement to be provided to the participant based on the member information stored in the data manager.

6. The intelligent service system of claim 5, wherein when there are a plurality of participants and the announcement generator receives member information of the plurality of participants from the data manager and determines that there is a social relationship between the plurality of participants, the announcement generator generates an announcement corresponding to the social relationship.

7. The intelligent service system of claim 1, further comprising a data manager configured to manage data for generating the announcement,
   wherein when the participant is not a member stored in the data manager, the announcement generator generates an announcement to be provided to the participant based on data previously stored in the data manager.

8. An intelligent service method for a simulators, the method comprising:
   a) collecting, by an information collection section, information on a simulation participant or onlookers from an information collector;
   b) generating, by an announcement generator, an announcement to be provided to the simulation participant or onlookers based on the collected information; and
   c) providing, by an announcement output section, the generated announcement to the participant or onlookers,
   wherein the simulator is surrounded by a fence on which a rail is provided,
   wherein the information collector includes at least one of a camera for obtaining image information on the participant or onlookers, a microphone for obtaining voice information on the participant or onlookers and a brainwave measurer for obtaining information on brainwaves of the participant or onlookers, the information collector being included in a robot travelling along the rail of the fence surrounding the simulator,
wherein the announcement output section includes at least one of a speaker and a display device.

9. The intelligent service method of claim 8, wherein when there are a plurality of participants and it is determined based on member information of the plurality of participants that there is a social relationship among the plurality of participants, an announcement corresponding to the social relationship is generated and simultaneously provided to the plurality of participants.

10. The intelligent service method of claim 8, wherein when there are a plurality of participants, different announcements are generated for the plurality of participants and separately provided to the participants during a simulation, or different announcements are simultaneously provided to the plurality of participants.

11. The intelligent service method of claim 8, wherein different announcements are generated for and separately provided to the participant and the onlookers.

12. The intelligent service method of claim 8, further comprising notifying the simulation participant of a boarding process by generating an announcement to notify the simulation participant to board on a simulator.

* * * * *